US 9,851,028 B2

(12) United States Patent
Stout et al.

(10) Patent No.: US 9,851,028 B2
(45) Date of Patent: Dec. 26, 2017

(54) COUPLING AND JOINT FOR FIXEDLY AND SEALINGLY SECURING COMPONENTS TO ONE ANOTHER

(71) Applicant: Mueller Industries, Inc., Memphis, TN (US)

(72) Inventors: Charles A. Stout, Cordova, TN (US); Marcus Robert Elmer, Cordova, TN (US); Christopher A. Mueller, Collierville, TN (US); Tommy L. Jamison, Hernando, MS (US)

(73) Assignee: Mueller Industries, Inc., Memphis, TN (US)

( * ) Notice: Subject to any disclaimer, the term of this patent is extended or adjusted under 35 U.S.C. 154(b) by 245 days.

(21) Appl. No.: 14/744,170

(22) Filed: Jun. 19, 2015

(65) Prior Publication Data

US 2015/0285420 A1    Oct. 8, 2015

Related U.S. Application Data

(63) Continuation-in-part of application No. 13/531,014, filed on Jun. 22, 2012, now abandoned.
(Continued)

(51) Int. Cl.
*F16L 37/14*    (2006.01)
*F16L 13/14*    (2006.01)
(Continued)

(52) U.S. Cl.
CPC ......... *F16L 13/142* (2013.01); *F16L 37/0845* (2013.01); *F16L 37/091* (2013.01)

(58) Field of Classification Search
CPC .............................. F16L 13/142; F16L 37/091
(Continued)

(56) References Cited

U.S. PATENT DOCUMENTS 2,225,208 A * 12/1940 Crickmer .............. F16L 37/091
                                                              285/382.7
3,343,252 A     9/1967 Reesor
(Continued)

FOREIGN PATENT DOCUMENTS

DE          10118956 C1    11/1957
DE          29721760 U1     2/2003
(Continued)

OTHER PUBLICATIONS

European Search Report and Written Opinion dated Mar. 28, 2014 in corresponding Application No. EP 14150073.6.
(Continued)

*Primary Examiner* — David E Bochna
(74) *Attorney, Agent, or Firm* — Harness, Dickey & Pierce, P.L.C.

(57) ABSTRACT

An assembly having a fitting body, a structure, an annular cavity within the fitting body, a grip ring, a seal element, and a spacing element. The structure has an end that is received in the fitting body. The annular cavity is disposed within the fitting body between an interior surface of the fitting body and an exterior surface of the structure. The grip ring, seal element, and spacing element are disposed in the annular cavity in a side-by-side relationship. The grip ring includes a plurality of first teeth that engage the exterior surface of the structure. Both the seal element and the spacing element extend radially across a height of the annular cavity such that the seal element and the spacing element each contact and sealingly engage the exterior surface of the structure and the interior surface of the fitting body.

18 Claims, 10 Drawing Sheets

Related U.S. Application Data

(60) Provisional application No. 61/500,907, filed on Jun. 24, 2011.

(51) Int. Cl.
   *F16L 37/084* (2006.01)
   *F16L 37/091* (2006.01)

(58) Field of Classification Search
   USPC .................................................. 285/382, 340
   See application file for complete search history.

(56) References Cited

U.S. PATENT DOCUMENTS

| | | | |
|---|---|---|---|
| 3,675,949 A | 7/1972 | Dawson | |
| 3,885,821 A * | 5/1975 | Philibert | F16L 27/12 285/382 |
| 3,915,480 A * | 10/1975 | Kish | F16L 37/0925 285/382 |
| 4,146,254 A * | 3/1979 | Turner | F16L 37/091 285/383 |
| 4,880,260 A * | 11/1989 | Gotoh | B21D 39/04 285/382.2 |
| 5,695,224 A * | 12/1997 | Grenier | F16L 37/091 285/340 |
| 6,145,753 A | 11/2000 | Yano et al. | |
| 6,805,385 B2 | 10/2004 | Viegener | |
| 7,316,429 B2 * | 1/2008 | Viegener | F16L 37/091 285/340 |
| 7,686,346 B1 * | 3/2010 | Buccicone | F16L 37/091 285/129.1 |
| 8,398,122 B2 * | 3/2013 | Crompton | F16L 37/091 285/340 |
| 8,480,134 B2 * | 7/2013 | Crompton | F16L 37/0915 285/340 |
| 8,517,431 B2 * | 8/2013 | Arning | F16L 37/091 285/382 |
| 8,528,944 B2 * | 9/2013 | Lee | F16L 37/091 285/340 |
| 8,888,145 B1 * | 11/2014 | Crompton | F16L 13/142 285/382 |
| 8,925,978 B2 * | 1/2015 | Jamison | F16L 37/091 285/382 |
| 2002/0135184 A1 | 9/2002 | Snyder et al. | |
| 2002/0158466 A1 | 10/2002 | Jones | |
| 2002/0185868 A1 | 12/2002 | Snyder et al. | |
| 2003/0038481 A1 | 2/2003 | Viegener | |
| 2005/0046189 A1 | 3/2005 | Corbett et al. | |
| 2009/0060635 A1 | 3/2009 | Jones et al. | |
| 2011/0049875 A1 * | 3/2011 | Stults | F16L 13/142 285/345 |

FOREIGN PATENT DOCUMENTS

| | | | | |
|---|---|---|---|---|
| DE | 102004044226 A1 | 12/2005 | | |
| EP | 0989348 A1 * | 3/2000 | | F16L 13/142 |
| EP | 2881641 A1 | 6/2015 | | |
| GB | 1569400 A | 6/1980 | | |
| KR | 10-1992-0002818 | 4/1992 | | |
| KR | 200389048 Y1 | 7/2005 | | |
| KR | 10-0881351 B1 | 2/2009 | | |
| KR | 101468508 B1 * | 12/2014 | | F16L 37/091 |
| WO | WO-2008-103315 A2 | 8/2008 | | |

OTHER PUBLICATIONS

European Search Report and Written Opinion completed Dec. 16, 2016 in corresponding Application No. EP 16173347.2.

European Search Report and Written Opinion dated Jun. 24, 2014 to corresponding to Application No. EP 13172873.5.

European Search Report and Written Opinion dated Apr. 24, 2015 in corresponding Application No. EP 15151017.9.

English Translation of Korean Office Action dated Apr. 3, 2014 in corrsponding Application No. KR10-2013-0047243.

\* cited by examiner

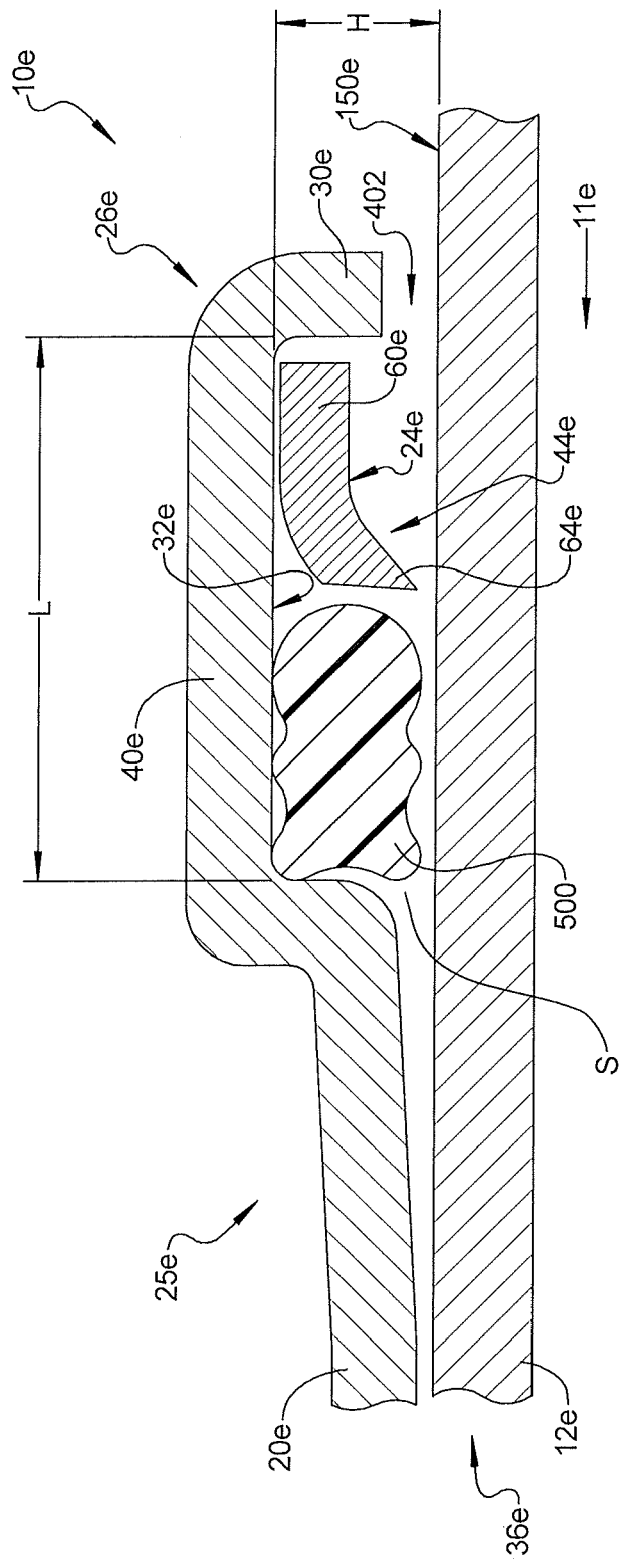

COUPLING AND JOINT FOR FIXEDLY AND SEALINGLY SECURING COMPONENTS TO ONE ANOTHER

CROSS-REFERENCE TO RELATED APPLICATIONS

This application is a Continuation-in-Part of U.S. patent application Ser. No. 13/531,014 filed Jun. 22, 2012, which claims the benefit of U.S. Provisional Patent Application No. 61/500,907 filed Jun. 24, 2011. The entire disclosure of the applications referenced above is incorporated herein by reference.

FIELD

The present invention generally relates to fluid conduit systems that may be employed, for example, for routing and delivering potable water, gases or chemicals.

BACKGROUND

This section provides background information related to the present disclosure which is not necessarily prior art.

There has long been a need for joining two components in a manner that fixedly and sealingly couples the components to one another. One extremely common application concerns the coupling of copper tubing that is commonly employed to transmit potable water in a building.

One system for joining components is disclosed in U.S. Pat. No. 7,316,429, which discloses connection piece having a sealing ring, a cutting ring and a T-shaped separating ring that spaces the sealing ring apart from the cutting ring. This system can be relatively expensive and as such, there remains a need in the art for an improved joining system.

SUMMARY

This section provides a general summary of the disclosure, and is not a comprehensive disclosure of its full scope or all of its features.

In one form the present teachings provide an assembly having a fitting body, a structure, an annular cavity within the fitting body, a grip ring, a seal element, and a spacing element. The insertion end of the fitting body includes a mount and an abutting wall. The mount and the abutting wall extend annularly to define an opening in the insertion end of the fitting body. The structure has an end that is received into the opening in the insertion end of the fitting body. The structure also has an exterior surface. The annular cavity is disposed within the insertion end of the fitting body that extends about the exterior surface of the structure. The insertion end of the fitting body includes an interior surface that is positioned outwardly of the exterior surface of the structure such that the annular cavity is defined between the interior surface of the insertion end and the exterior surface of the structure. The annular cavity has a height that is measured radially between the interior surface of the insertion end and the exterior surface of the structure.

The grip ring is disposed in the annular cavity adjacent to the abutting wall. The grip ring includes a ring body that extends about the structure and a plurality of first teeth that are resiliently coupled to the ring body. The plurality of first teeth extend radially inwardly to engage the exterior surface of the structure. The seal element and the spacing element are also disposed in the annular cavity next to the grip ring. Both the seal element and the spacing element are made of a resilient material and therefore are compressible. The seal element extends radially across the height of the annular cavity such that the seal element contacts and sealingly engages the exterior surface of the structure and the interior surface of the insertion end of the fitting body. The spacing element also extends radially across the height of the annular cavity such that the spacing element contacts and sealingly engages the exterior surface of the structure and the interior surface of the insertion end of the fitting body. Advantageously, the spacing element acts to seal the annular cavity as well as maintain the longitudinal position of the seal element and the grip ring within the annular cavity. Together, the seal element and the spacing element define multiple contact points along the interior surface of the insertion end of the fitting body and multiple contact points along the exterior surface of the structure to provide improved sealing of the annular cavity.

In another form, the present teachings provide an assembly having a combined seal and spacing element. Accordingly, the seal element and the spacing element described above are connected. By way of example and without limitation, the combined seal and spacing element may be one piece that is integrally formed. The combined seal and spacing element is made of a resilient material and therefore is compressible. The fitting body has a throat portion and the annular cavity extends longitudinally between the throat portion of the fitting body and the abutting wall. The combined seal and spacing element is disposed in the annular cavity and extends longitudinally between the throat portion of the fitting body and the grip ring. The combined seal and spacing element extends radially across and the height of the annular cavity at multiple longitudinally spaced locations. Accordingly, the combined seal and spacing element contacts and sealingly engages the exterior surface of the structure at multiple contact points and the combined seal and spacing element contacts and sealingly engages the interior surface of the insertion end at multiple contact points. Advantageously, the combined seal and spacing element acts to seal the annular cavity at multiple contact points for improved sealing and maintains the longitudinal position of the grip ring within the annular cavity. Additionally, the combined seal and spacing element provides a higher burst pressure rating of the assembly because the combined seal and spacing element expands and fills a greater volume of the annular cavity when the structure is inserted through the opening in the insertion end and into the throat portion of the fitting body and as the insertion end of the fitting body is compressed during installation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 11A is a longitudinal sectional view of a portion of a seventh assembly constructed in accordance with the teachings of the present disclosure where the assembly is shown in an expanded position;

Corresponding reference numerals indicate corresponding parts throughout the several views of the drawings.

DETAILED DESCRIPTION

Figure 1:
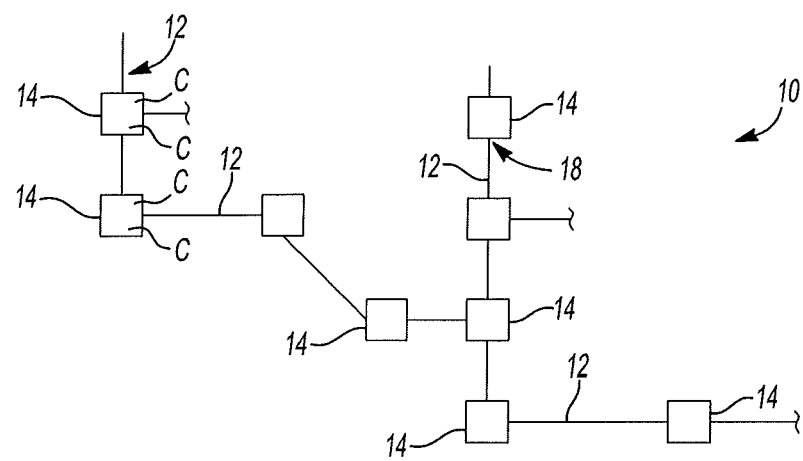
FIG. 1 is a schematic illustration of an exemplary assembly constructed in accordance with the teachings of the present disclosure.

With reference to FIG. 1 of the drawings, an assembly constructed in accordance with the teachings of the present invention is generally indicated by reference numeral 10. With additional reference to FIGS. 2 and 3, the assembly 10 can include a component or structure 12 and a fitting 14. In the particular example illustrated, the assembly 10 is suited for use in communicating (i.e., supplying, delivering, routing) a fluid, such as a gas or liquid and as such, the structure 12 is illustrated to be a length of tubing. More particularly, the structure 12 in the particular embodiment illustrated is a length of drawn (full hard) copper tubing that is suitable for use in a system for the transmission of potable water. It will be appreciated, however, that the teachings of the present invention have broader applicability and as such, the scope of the present disclosure (and appended claims) is not limited to the particular application of the invention described and illustrated herein but rather extends to any joint wherein the components of the joint are fixedly and sealingly joined in the manner disclosed herein. In this regard, it will be appreciated that the structure 12 need not be a tubular structure but rather could be any structure, such as a shaft, that sufficiently corresponds in size and shape to the fitting 14 so that a sealed or fluid-tight joint or connection may be formed therebetween.

Figure 2:
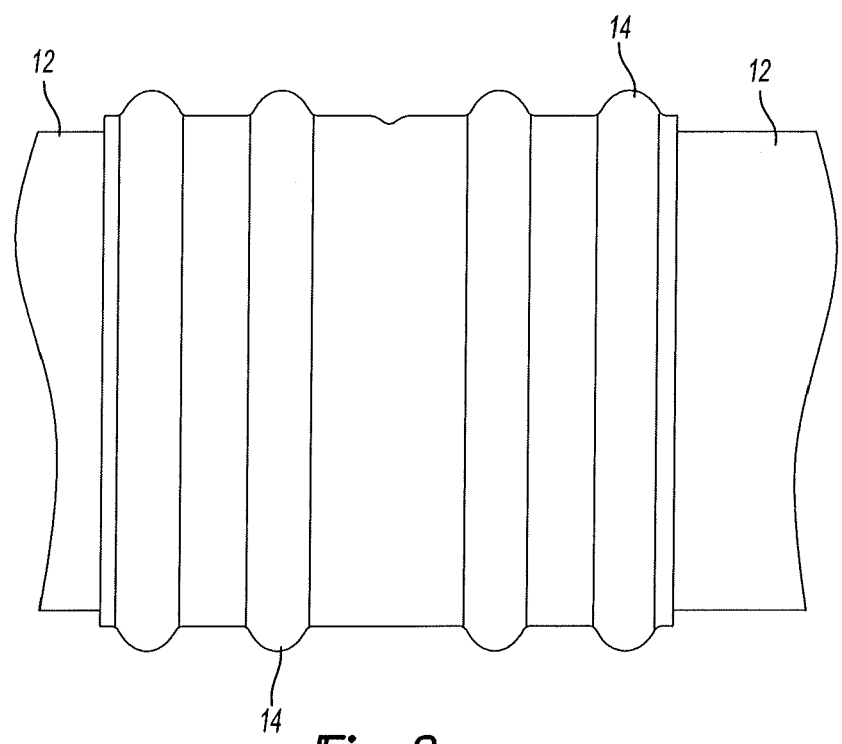
FIG. 2 is a side elevation view of a portion of the assembly of FIG. 1.
Figure 3:
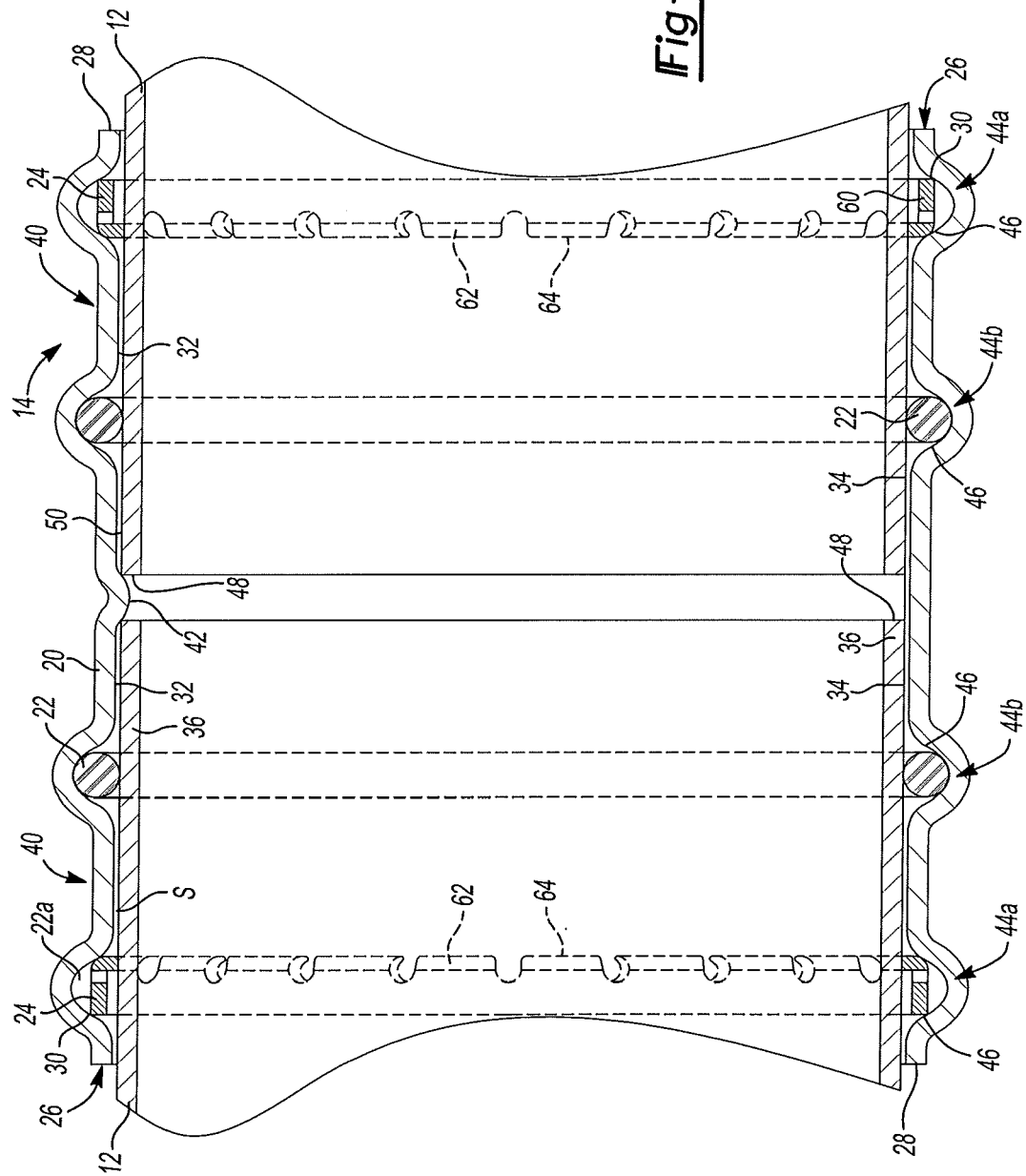
FIG. 3 is a longitudinal section view of the portion of the assembly that is illustrated in FIG. 2.

In FIGS. 2 and 3, the fitting 14 can include a body 20, a seal element 22 and a grip ring 24. It will be appreciated that although the particular fitting illustrated is a straight union, the teachings of the present invention have applicability to various other types of fittings, including elbows, tees, caps, adapters, reducers, bushings, etc.

The body 20 can be made from any structural but ductile material, such as copper, brass, bronze, stainless steel or another metal. In the example provided, the body 20 is made of a copper alloy so as to eliminate the potential for a galvanic reaction with the copper alloy of the structure 12. The body 20 can include a hollow insertion end 26 that can have an end face 28, an abutting wall 30 and an interior surface 32. A cavity 34 defined by insertion end 26 can be configured to receive an associated end 36 of the structure 12.

Optionally, the body 20 can include a mount 40 and a stop 42. The mount 40 can be configured to hold and position the seal element 22 and/or the grip ring 24, while the stop 42 can be a feature that inhibits the insertion of the structure 12 into the cavity 34 beyond a predetermined distance. For example, the mount 40 can define a pair of annular cavities 44a, 44b having a semi-toric inner surface 46 and the stop 42 can comprise a necked down area and/or one or more dimples and/or an annular roll (formed in the body 20) that can extend into the cavity 34 such that an axial end face 48 of the end 36 of the structure 12 can contact the stop 42 to limit an amount by which the end 36 is inserted into the body 20.

The seal element 22 can be any type of seal that is configured to sealingly engage the interior surface 32 of the insertion end 26 and an exterior surface 50 of the end 36 of the structure 12. In the particular example provided, the seal element 22 comprises an O-ring that is received in the annular cavity 44b and is sized to sealingly engage the interior and exterior surfaces 32 and 50 upon insertion of the end 36 of the structure 12 into the insertion end 26 of the body 20 and through the seal element 22. It will be appreciated, however, that the seal element 22 could be configured to sealingly engage the interior surface 32 and/or the exterior surface 50 only after the body 20 has been secured to the structure 12 to inhibit axial movement of the fitting 14 relative to the structure 12.

Figure 4:
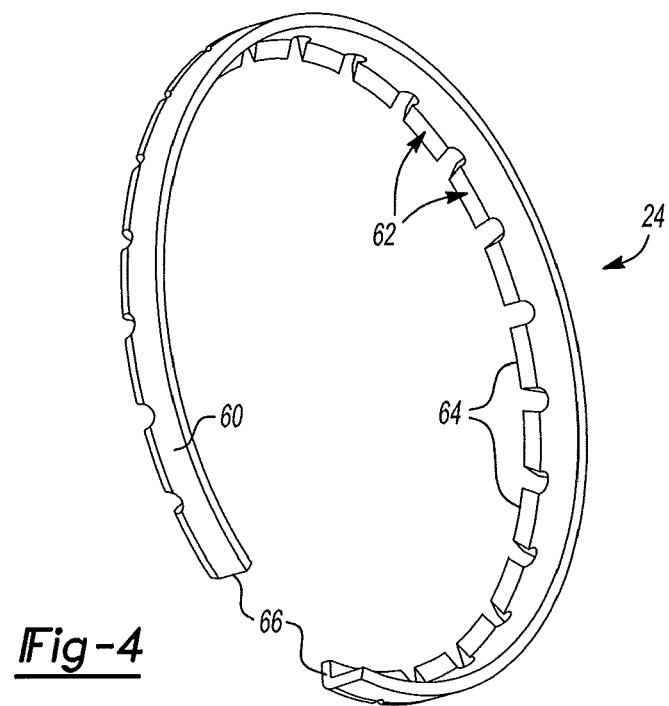
FIG. 4 is a perspective view of a portion of the assembly of FIG. 1, illustrating the grip ring in more detail.

With reference to FIGS. 3 and 4, the grip ring 24 can be configured to permit the end 36 of the structure 12 to be inserted into the insertion end 26 but resist withdrawal of the end 36 of the structure 12 from the insertion end 26. The grip ring 24 can have a ring body 60 and a plurality of gripping elements 62 that can be coupled to the ring body 60. In the particular example provided, the ring body 60 defines a circumferentially extending structure that is abutted against the abutting wall 30, while the gripping elements 62 comprise circumferentially spaced-apart teeth 64 that are resiliently coupled to a proximal end of the ring body 60. The teeth 64 can extend from the ring body 60 in direction that is radially-inward and axially away from the proximal end 36 of the ring body 60. The grip ring 24 can be received in the cavity 34 in the insertion end 26 and can be coupled to the body 20 in a manner that limits movement of the grip ring 24 in an axial direction relative to the body 20 (e.g., such that movement of the grip ring 24 in a direction that would withdraw the grip ring 24 from the insertion end 26 causes the grip ring 24 to contact the abutting wall 30). In the example provided, the grip ring 24 is received in the annular cavity 44a in the mount 40 such that grip ring 24 impinges on the semi-toric inner surface 46 to thereby limit axial movement of the grip ring 24.

In the example provided, the grip ring 24 has open ends 66, which permits the grip ring 24 to be inserted into the annular cavity 44a after the body 20 of the fitting 14 has been formed. It will be appreciated, however, that the grip ring 24 can be formed in an endless manner and that in such case, it may be desirable to install the grip ring 24 into the fitting 14 prior to the formation of the abutting wall 30.

Returning to FIGS. 1 and 3, the fitting 14 can be coupled to the structure 12 by inserting the end 36 of the structure 12 into the insertion end 26 and forcing the end 36 axially through the grip ring 24 and the seal element 22. The seal element 22 may be configured such that it does not sealingly engage one or both of the interior surface 32 of the insertion end 26 (i.e., the semi-toric inner surface 46 in the particular example provided) and the exterior surface 50 of the end 36 of the structure 12. In the particular example provided, however, the seal element 22 sealingly engages both the interior surface 32 of the insertion end 26 (i.e., the semi-toric inner surface 46 in the particular example provided) and the exterior surface 50 of the end 36 of the structure 12 when the end 36 of the structure 12 is inserted through the seal element 22. It will be appreciated that the grip ring 24 is configured to inhibit axial withdrawal of the end 36 of the structure 12 from the insertion end 26. A commercially-available crimping tool (not shown), such as CT400 crimp tool marketed by Rigid or an M20+ crimp tool marketed by Stanley Bostitch, can be employed to deform the insertion end 26 of the fitting 14 (schematically indicated by reference letter C in FIG. 1) to substantially permanently couple the fitting 14 to the structure 12. Additionally or alternatively, insertion end 26 of the fitting 14 could be deformed by the commercially available crimping tool to create or improve sealing engagement of the seal element 22 with the interior surface 32 of the insertion end 26 (i.e., the semi-toric inner surface 46 in the particular example provided) and/or the exterior surface 50 of the end 36 of the structure 12.

While the grip ring 24 has been illustrated and described as being axially closer to the end face 28 of the insertion end 26, it will be appreciated that the positions of the grip ring 24 and the seal element 22 could be reversed. It will also be appreciated that the spacing between the seal element 22 and the grip ring 24 can be sized in a desired manner (e.g., to accommodate the jaws of the commercially-available crimp tool mentioned above) and that multiple seal elements 22 and/or grip rings 24 could be employed if desired.

Figure 5:
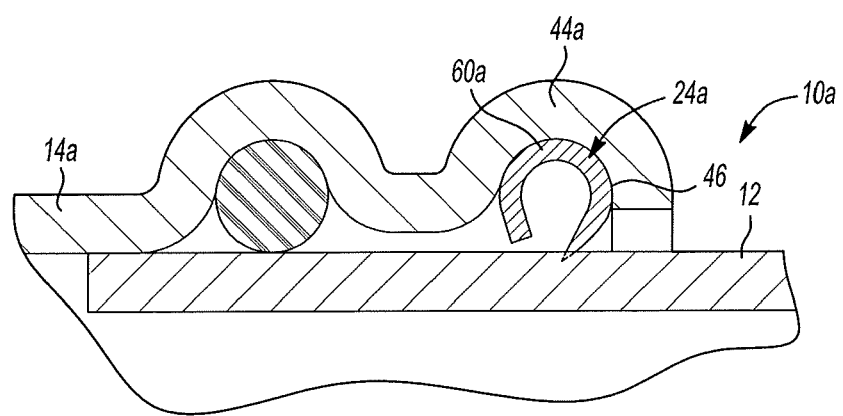
FIG. 5 is a longitudinal section view of a portion of a second assembly constructed in accordance with the teachings of the present disclosure.

While the grip ring 24 has been illustrated in the above-example as comprising a ring body 60 having a generally rectangular cross-sectional shape, it will be appreciated that the ring body 60 could be formed differently. With reference to FIG. 5, a portion of another assembly constructed in accordance with the teachings of the present disclosure is generally indicated by reference numeral 10a. The assembly 10a can be generally similar to the assembly 10 of FIG. 1 except that the grip ring 24a has a ring body 60a having a cross-sectional shape that is defined by at least one radius such that the ring body 60a of the grip ring 24a is able to pivot on the semi-toric inner surface 46 of the annular cavity 44a more easily than the grip ring 24 that is depicted in FIGS. 3 and 4. Stated another way, the ring body 60a has an exterior surface that is shaped in a complementary manner to the semi-toric interior surface 46 of the annular cavity 44a. Relative to the configuration illustrated in FIGS. 3 and 4, the configuration of the grip ring 24a in this manner may reduce the force that is needed to insert the structure through the grip ring and/or may increase the retention force of the grip ring 24a (i.e., the force needed to pull the structure 12 from the fitting 14a once the structure 12 has been fully inserted into the insertion end 26a of the fitting 14a).

Figure 6:
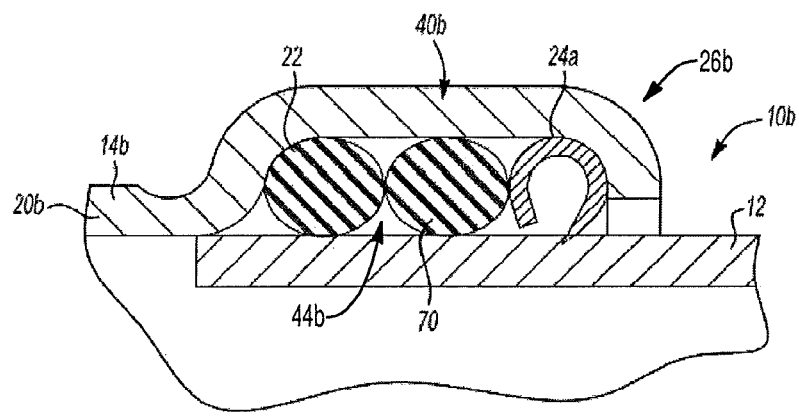
FIG. 6 is a longitudinal section view of a portion of a third assembly constructed in accordance with the teachings of the present disclosure.

In FIG. 6, a portion of a third assembly constructed in accordance with the teachings of the present disclosure is generally indicted by reference numeral 10b. The assembly 10b can include the structure 12 and a fitting 14b, which can be generally similar to the fitting 14 (FIG. 2) except as detailed herein. In this example, the mount 40b of the insertion end 26b can be sized to receive the seal element 22, a spacing element 70, and the grip ring 24a. While the grip ring 24 is depicted in FIG. 6 as being similar to the grip ring employed in FIG. 5, it will be appreciated that the grip ring depicted in FIG. 4 could be employed in the alternative. The spacing element 70 can be any type of structure that is configured to axially space the seal element 22 apart from the grip ring 24a and need not be configured to form a seal. In the particular example provided however, the spacing element 70 is a seal that is configured to sealingly engage against the body 20b and the structure 12. Any type of seal may be employed for the spacing element 70, but in the example provided, the spacing element 70 is an O-ring that is identical to that which is employed for the seal element 22. It will be appreciated, however, that if a seal is employed as the spacing element 70, the seal need not be identical to that which is employed for the seal element 22.

In situations where a seal is employed for the spacing element 70, those of skill in the art will appreciate that the spacing element 70 is a secondary seal (whereas the seal element 22 is a primary seal).

Figure 7:
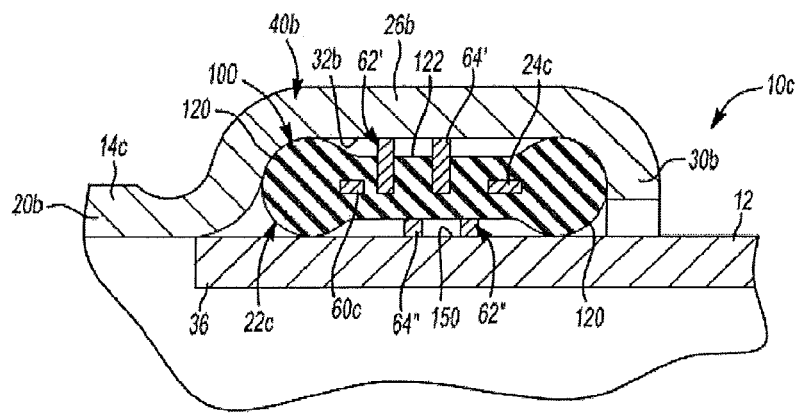
FIG. 7 is a longitudinal section view of a portion of a fourth assembly constructed in accordance with the teachings of the present disclosure.

In the example of FIG. 7, a portion of a fourth assembly constructed in accordance with the teachings of the present disclosure is generally indicted by reference numeral 10c. The assembly 10c can include a fitting 14c that is similar to the fitting 14b of FIG. 6 except as described herein. In this example, a seal and gripping assembly 100 is employed in the mount 40b in the insertion end 26b of the body 20b. The seal and gripping assembly 100 can comprise a sealing element 22c and a grip ring 24c.

The grip ring 24c can have a ring body 60c, a first set of gripping elements 62' and a second set of gripping elements 62". The ring body 60c can be a circumferentially extending structure to which the first and second sets of gripping elements 62' and 62" can be coupled. The first set of gripping elements 62' can comprise first teeth 64' that can extend in a first direction that is radially outwardly from the ring body 60c and axially toward the abutting wall 30b, while the second set of gripping elements 62" can comprise second teeth 64" that can extend in a second direction that can be radially inwardly from the ring body 60c and axially away from the abutting wall 30b. The first teeth 64 can be disposed in one or more rows (two rows are employed in the particular example illustrated) and can be configured to engage the interior surface 32b of the insertion end 26b to inhibit axial movement of the grip ring 24c in a direction that would tend to withdraw the grip ring 24c directly from the insertion end 26c. The second teeth 64 can be disposed in one or more rows (two rows are employed in the particular example illustrated) and can be configured to engage the exterior surface 50 of the end 36 of the structure 12 to inhibit axial movement of the grip ring 24c in a direction that would permit the grip ring 24c from being withdrawn from the end 36 of the structure 12. The grip ring 24c can be unitarily formed as a continuous annular structure (i.e., in an endless manner). In the particular example provided, however, the grip ring 24c is formed in a discontinuous manner from sheet stock (e.g., carbon steel sheet metal, stainless steel sheet metal) through a progressive die, fourslide or multi-slide. If desired, the ends of the sheet stock material may be joined together in an appropriate manner, such as welding. The grip ring 24c can be subjected to secondary processes, such as plating or heat treating, if desired.

The seal element 22c can be coupled to the grip ring 24c in any desired manner. In the particular example provided, the seal element 22c is formed from an elastomeric material that is overmolded to the grip ring 24c such that the seal element 22c is cohesively bonded to the grip ring 24c. The seal element 22c can define one or more seal members 120 that can be coupled directly to the grip ring 24c. If desired, the seal element 22c can also comprise one or more link members 122 that can aid in orienting and/or retaining the seal members 120.

It will be appreciated from this disclosure that the differently facing first and second teeth 64' and 64" permit the grip ring 24c to grip to both the body 20b of the fitting 14b and the end 36 of the structure 12. It will also be appreciated that it may be desirable to insert the seal and gripping assembly 100 prior to the formation of the abutting wall 30b.

Figure 8:
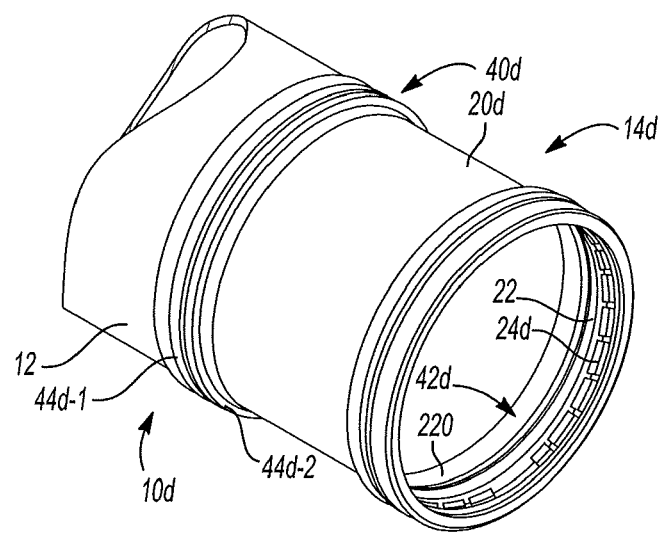
FIG. 8 is a perspective view of a portion of a fifth assembly constructed in accordance with the teachings of the present disclosure.
Figure 9:
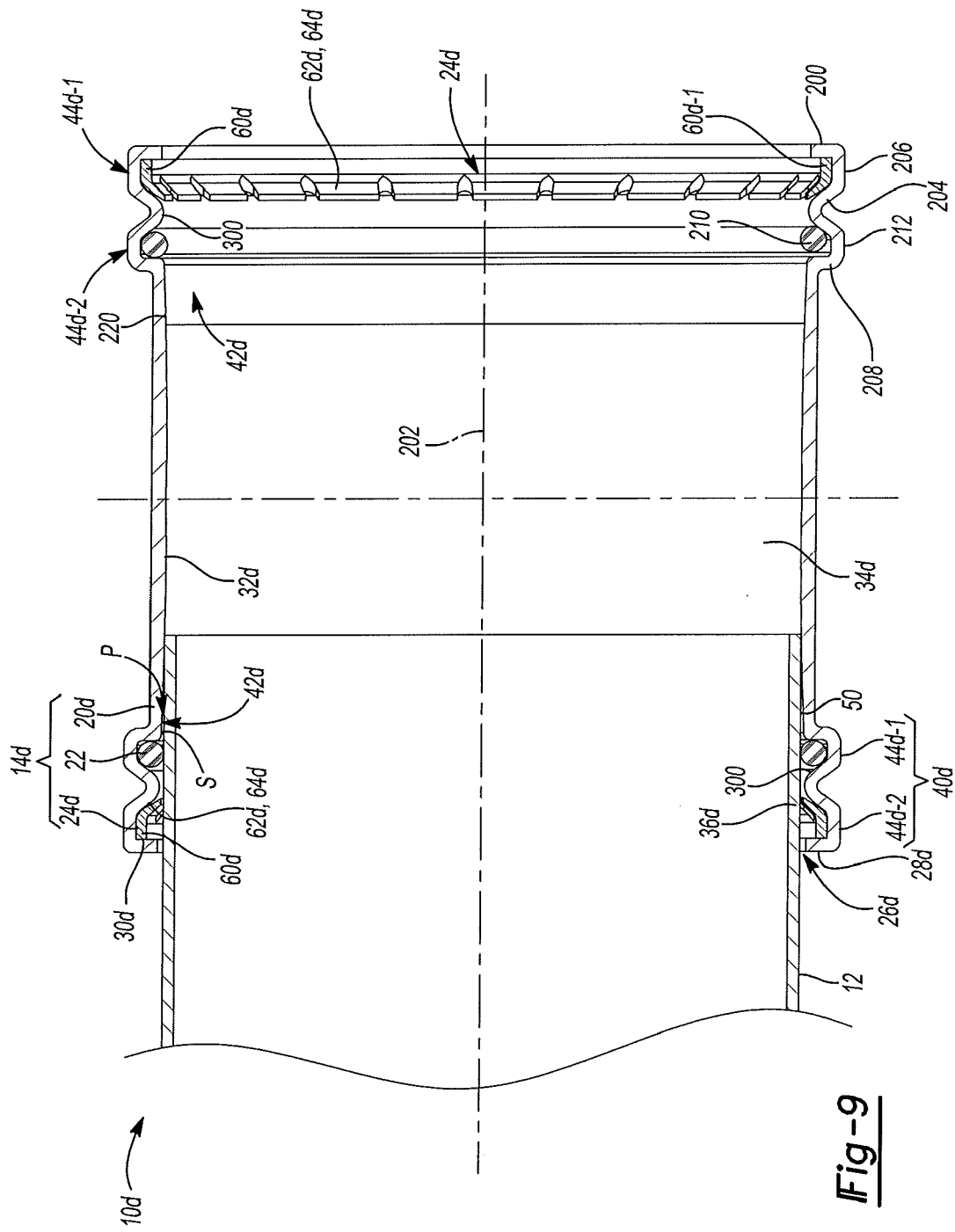
FIG. 9 is a longitudinal cross-sectional view of the portion of the assembly of FIG. 8.

With reference to FIGS. 8 and 9, a portion of a fifth assembly constructed in accordance with the teachings of the present disclosure is generally indicated by reference numeral 10d. The assembly 10d can comprise a structure 12 and a fitting 14d. The fitting 14d can include a body 20d, a seal element 22, and a grip ring 24d.

The body 20d can be made from any structural but ductile material, such as copper, brass, bronze, stainless steel or another metal. In the example provided, the body 20d is made of a copper alloy so as to eliminate the potential for a galvanic reaction with the copper alloy of the structure 12. The body 20d can include a hollow insertion end 26d that can have an end face 28d, an abutting wall 30d and an interior surface 32d. A cavity 34d defined by insertion end 26d can be configured to receive an associated end 36d of the structure 12.

Optionally, the body 20d can include a mount 40d and a stop 42d. The mount 40d can be configured to hold and position the seal element 22 and/or the grip ring 24d, while the stop 42d can be a feature that inhibits the insertion of the structure 12 into the cavity 34d beyond a predetermined distance. For example, the mount 40d can define a pair of annular cavities 44d-1, 44d-2. The annular cavity 44d-1 can be defined by a first wall member 200, which can be disposed generally perpendicular to the longitudinal axis 202 of the body 20d, a second wall member 204 that can be generally V-shaped in cross-section, and a third wall member 206 that can extend axially between the first and second wall members 200, 204. If desired, the first wall member 200 and/or the second wall member 204 can extend radially inwardly to an extent where it/they can aid in supporting the end 36d of the structure 12 (e.g., to help align the structure 12 to the longitudinal axis 202). The annular cavity 44d-2 can be defined by the second wall member 204, a fourth wall member 208, which can have a concave inner surface 210, and a fifth wall member 212 that can extend axially between and connect the second wall member 204 to the fifth wall member 212. As another example, the stop 42d can comprise a frusto-conical zone 220 on the interior surface 32d that can align the structure 12 to the longitudinal axis 202, as well as to inhibit insertion of the end 36d of the structure 12 into the interior cavity 34d beyond a predetermined dimension.

The grip ring 24d can be configured to permit the end 36d of the structure 12 to be inserted into the insertion end 26d but to resist withdrawal of the end 36d of the structure 12 from the insertion end 26d. The grip ring 24d can have a ring body 60d and a plurality of gripping elements 62d that can be coupled to the ring body 60d. In the particular example provided, the ring body 60d defines a circumferentially extending structure that is abutted against the abutting wall 30d, while the gripping elements 62d comprise circumferentially spaced-apart teeth 64d that are resiliently coupled to a proximal end 60d-1 of the ring body 60d. The teeth 64d can extend from the ring body 60d in direction that is radially-inward and axially away from the proximal end 60d-1 of the ring body 60d. The grip ring 24d can be received in the cavity 34d in the insertion end 26d and can be coupled to the body 20d in a manner that limits movement of the grip ring 24d in an axial direction relative to the body 20d (e.g., such that movement of the grip ring 24d in a direction that would withdraw the grip ring 24d from the insertion end 26d causes the grip ring 24d to contact the abutting wall 30d). In the example provided, the grip ring 24d is received in the annular cavity 44d-1 in the mount 40d such that grip ring 24d abuts the first wall member 200 and is at least partly supported by the second wall member 204 (e.g., the teeth 64d lie along a portion of a side of the second wall member 204) to thereby limit axial movement of the grip ring 24d. The grip ring 24d can have open ends (not shown), which permits the grip ring 24d to be inserted into the annular cavity 44d-1 after the body 20d of the fitting 14d has been formed. It will be appreciated, however, that the grip ring 24d could be formed in an endless manner and that in such case, it may be desirable to install the grip ring 24d into the fitting 14d prior to the formation of the first wall member 200.

The fitting 14d can be coupled to the structure 12 by inserting the end 36d of the structure 12 into the insertion end 26d and forcing the end 36d axially through the grip ring 24d and the seal element 22. The seal element 22 may be configured such that it does not sealingly engage one or both of the interior surface 32d of the insertion end 26d and the exterior surface 50 of the end 36d of the structure 12. In the particular example provided, however, the seal element 22 sealingly engages both the interior surface 32d of the insertion end 26d and the exterior surface 50 of the end 36d of the structure 12 when the end 36d of the structure 12 is inserted through the seal element 22. It will be appreciated that the grip ring 24d is configured to inhibit axial withdrawal of the end 36d of the structure 12 from the insertion end 26d. A commercially-available crimping tool (not shown), such as CT400 crimp tool marketed by Rigid or an M20+ crimp tool marketed by Stanley Bostitch, can be employed to deform the insertion end 26d of the fitting 14d to substantially permanently couple the fitting 14d to the structure 12d. Additionally or alternatively, insertion end 26d of the fitting 14d could be deformed by the commercially available crimping tool to create or improve sealing engagement of the seal element 22 with the interior surface 32d of the insertion end 26 and/or the exterior surface 50d of the end 36d of the structure 12.

It will be appreciated that this configuration provides a leak path P where pressurized fluid may leak in a space S between the end 36d of the structure 12 and the mount 40d and can urge the seal element 22 against both a sloped frusto-conical surface 300 of the second wall member 204 and the exterior surface of the structure 12. Movement of the seal element 22 in this manner drives the seal element 22 in an axial direction (i.e., axially outwardly of the insertion end 26d) so that it is further compressed between sloped frusto-conical surface 300 and the exterior surface of the structure 12 to provide improved sealing.

Figure 10A:
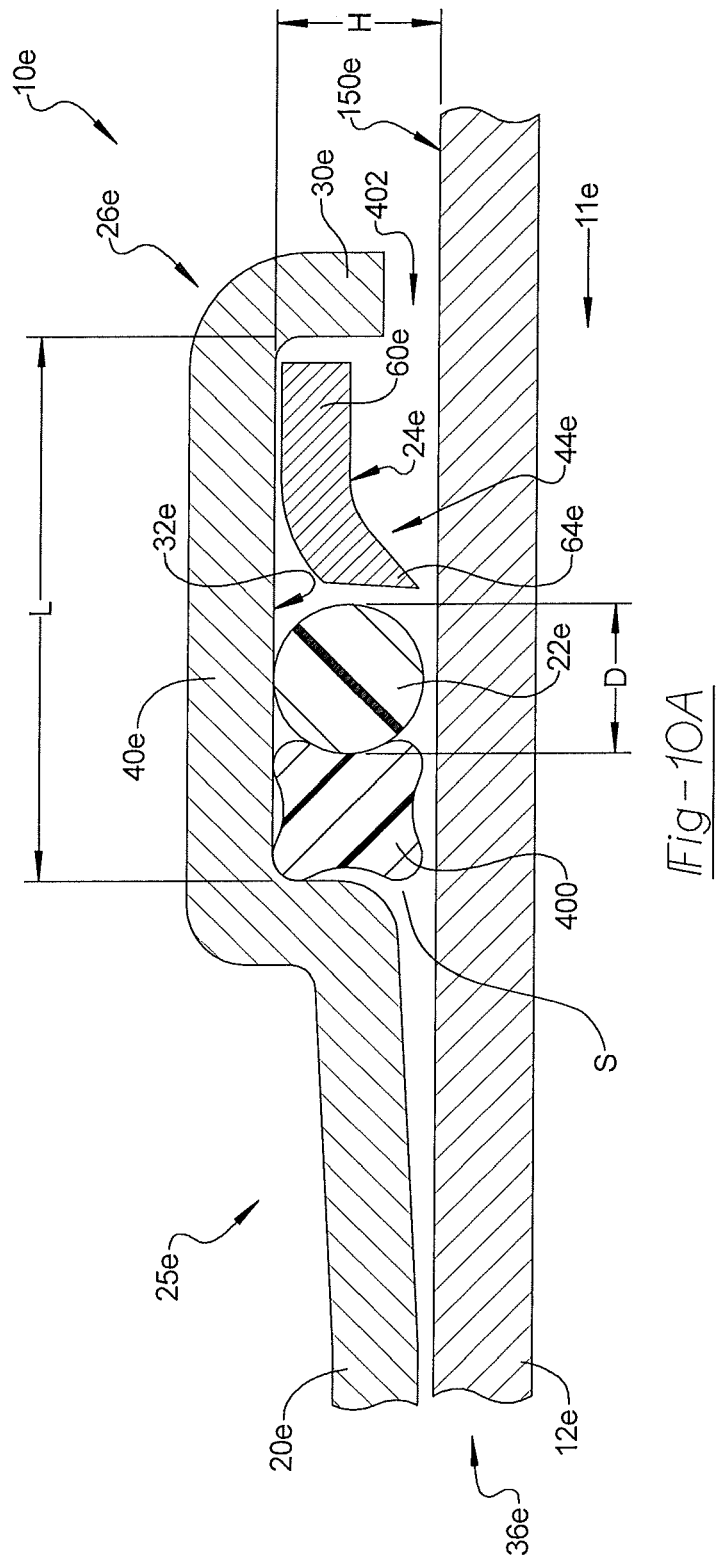
FIG. 10A is a longitudinal sectional view of a portion of a sixth assembly constructed in accordance with the teachings of the present disclosure where the assembly is shown in an expanded position.
Figure 10B:
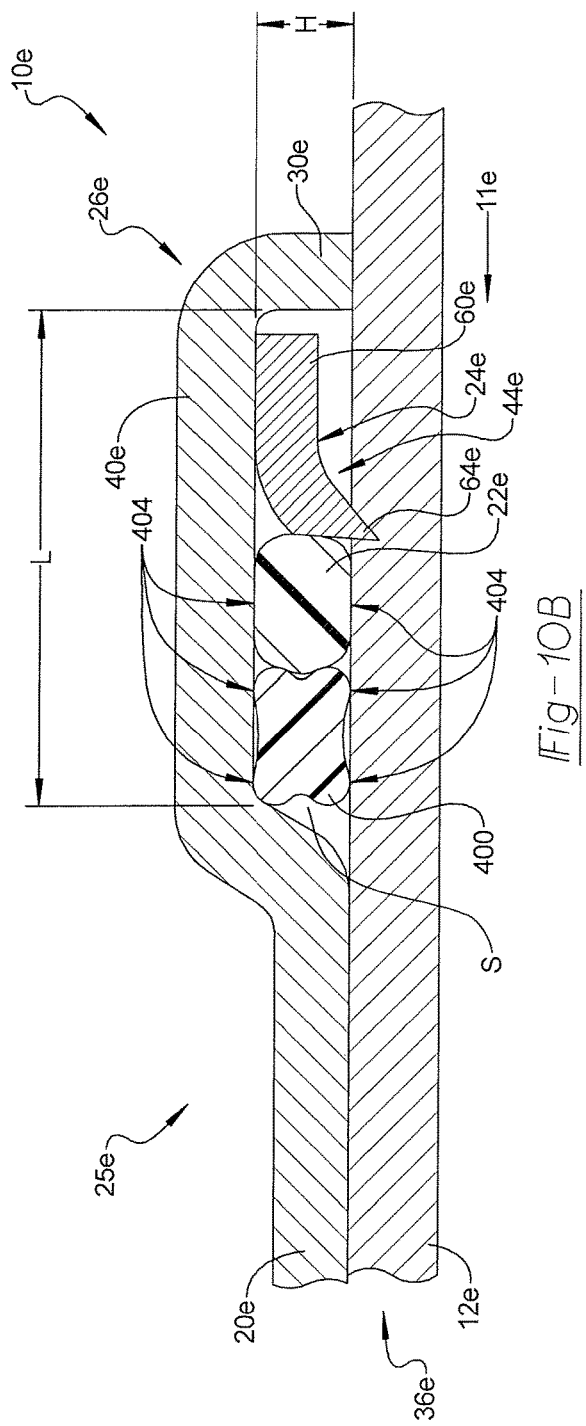
FIG. 10B is another longitudinal sectional view of the portion of the assembly of FIG. 10A where the assembly is shown in a compressed position.
Figure 10C:
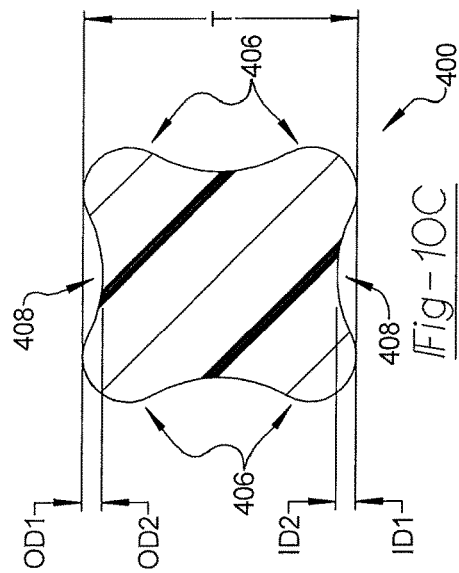
FIG. 10C is a longitudinal sectional view of a portion of an exemplary spacing element of the assembly of FIG. 10A.

With reference to FIG. 6 and FIGS. 10A-10C, two assemblies 10b, 10e are illustrated where the annular cavity 44b, 44e that is defined by the insertion end 26b, 26e of the fitting body 20b, 20e houses a grip ring 24a, 24e, a seal element 22, 22e, and a spacing element 70, 70e in a side-by-side relationship. In FIGS. 10A-10C, the assembly 10b of FIG. 6 has been modified. In FIG. 6, the spacing element 70 is disposed within the annular cavity 44b and is positioned longitudinally between the grip ring 24a and the seal element 22. Additionally, the seal element 22 and the spacing element 70 both have circular cross-sections in FIG. 6. In FIGS. 10A-10C, the spacing element 400 has been modified to include a non-circular cross-section and the order of the seal element 22e and the spacing element 400 in the annular cavity 44e has been rearranged.

Referring to FIGS. 10A-10C, the assembly 10e generally includes a fitting body 20e, a structure 12e, an annular cavity 44e within the fitting body 20e, a grip ring 24e, a seal element 22e, and a spacing element 400. The fitting body 20e includes a throat portion 25e and an insertion end 26e. The insertion end 26e of the fitting body 20e includes a mount 40e and an abutting wall 30e. The fitting body 20e has an outside diameter that is larger at the mount 40e of the insertion end 26e than at the throat portion 25e. The mount 40e and the abutting wall 30e extend annularly to define an opening 11e in the insertion end 26e of the fitting body 20e. The structure 12e has an end 36e that is received into the opening 11e in the insertion end 26e of the fitting body 20e. As the end 36e of the structure 12e proceeds through the opening 11e during insertion, the end 36e of the structure 12e is eventually received in the throat portion 25e of the fitting body 20e. The structure 12e also has an exterior surface 150e. In other words, the structure 12e functions as a male component of the assembly 10e and is received in the fitting body 20e, which acts as a female component of the assembly 10e. By way of example and without limitation, the structure 12e may be a pipe, tube, hose, or conduit. Such structures 12e are commonly known and used in the construction industry to transport fluid throughout a building.

The annular cavity 44e is disposed within the insertion end 26e of the fitting body 20e and is generally defined by the mount 40e. The annular cavity 44e extends annularly about the exterior surface 150e of the structure 12e. The insertion end 26e of the fitting body 20e includes an interior surface 32e that is positioned radially outwardly of the exterior surface 150e of the structure 12e. Accordingly, the annular cavity 44e is defined between the interior surface 32e of the insertion end 26e and the exterior surface 150e of the structure 12e.

The fitting body 20e is made of a deformable material (i.e. a flexible material) such that the mount 40e and the abutting wall 30e of the insertion end 26e transition from an expanded position (as shown in FIG. 10A) to a compressed position (as shown in FIG. 10B). By way of example and without limitation, the resilient material of the fitting body 20e may be a polymer or a metal. Both the seal element 22e and the spacing element 400 are made of a resilient material and therefore are compressible. By way of example and without limitation, the seal element 22e and the spacing element 400 may be made of a polymer, including elastomers such as rubber. Furthermore, the seal element 22e and the spacing element 400 may be made of the same material or two different materials of different elasticity. In the expanded position, the abutting wall 30e is spaced from the exterior surface 150e of the structure 12e by a gap 402. In the compressed position, the abutting wall 30e moves radially inwardly toward the exterior surface 150e of the structure 12e. In the compressed position, the abutting wall 30e may or may not contact the exterior surface 150e of the structure 12e. Accordingly, the gap 402 is either reduced to a smaller size or is closed when the mount 40e and the abutting wall 30e of the insertion end 26e transition from the expanded position to the compressed position. The mount 40e and the abutting wall 30e of the insertion end 26e may be transitioned from the expanded position to the compressed position by applying radially inward pressure to the mount 40e. By way of example and without limitation, this transition may be effectuated by a crimping operation that is performed using a form of the crimp tool previously described.

As best seen in FIG. 10B, the annular cavity 44e has a height H that is measured radially between the interior surface 32e of the insertion end 26e and the exterior surface 150e of the structure 12e. It should be appreciated that the height H of the annular cavity 44e varies depending on whether the mount 40e and the abutting wall 30e of the insertion end 26e are in the expanded position or the compressed position. Indeed, the height H of the annular cavity 44e diminishes (i.e. is reduced) when the mount 40e and the abutting wall 30e of the insertion end 26e transition from the expanded position to the compressed position.

Still referring to FIGS. 10A-10C, the grip ring 24e is disposed in the annular cavity 44e adjacent to the abutting wall 30e. The grip ring 24e includes a ring body 60e that extends annularly about the structure 12e and a plurality of first teeth 64e that are resiliently coupled to the ring body 60e. The plurality of first teeth 64e extend radially inwardly and engage the exterior surface 150e of the structure 12e when the mount 40e and the abutting wall 30e of the insertion end 26e are in the compressed position (as shown in FIG. 10B). The seal element 22e and the spacing element 400 are also disposed in the annular cavity 44e next to the grip ring 24e. The seal element 22e extends radially across the height H of the annular cavity 44e such that the seal element 22e contacts and sealingly engages the exterior surface 150e of the structure 12e and the interior surface 32e of the insertion end 26e of the fitting body 20e. The spacing element 400 also extends radially across the height H of the annular cavity 44e such that the spacing element 400 contacts and sealingly engages the exterior surface 150e of the structure 12e and the interior surface 32e of the insertion end 26e of the fitting body 20e.

Advantageously, the spacing element 400 acts to seal the annular cavity 44e as well as maintain the longitudinal position of the seal element 22e and the grip ring 24e within the annular cavity 44e. Together, the seal element 22e and the spacing element 400 define multiple contact points 404 along the interior surface 32e of the insertion end 26e of the fitting body 20e and multiple contact points 404 along the exterior surface 150e of the structure 12e to provide improved sealing of the annular cavity 44e (as shown in FIG. 10B). These multiple contact points 404 improve sealing by creating a tortuous path for fluid flow. Thus, the multiple contact points 404 created by the seal element 22e and the spacing element 400 isolate the grip ring 24e from fluid that may be contained within the annular cavity 44e at space S. It should therefore be appreciated that the term "spacing element" as used herein is not intended to limit the function of the spacing element to spacing only, since the disclosed spacing element 400 performs both sealing and spacing functions.

When the assembly 10e is in use, fluid may be transported through the structure 12e. Pressure may cause some of the fluid exiting the end 36e of the structure 12e within the throat portion 25e of the fitting body 20e to flow back along the structure 12e between the exterior surface 150e of the structure 12e and the fitting body 20e. When this back-flow of fluid enters the annular cavity 44e at space S, the spacing element 400 and the seal element 22e seal the annular cavity 44e and prevent the fluid from reaching the grip ring 24e. It should be appreciated that the grip ring 24e does not stop fluid flow because fluid can pass between the plurality of first teeth 64e. Further, the grip ring 24e may be provided with a split extending between two open ends 66 in the grip ring 24e (as shown in FIG. 4). Fluid may follow between these open ends 66 in the grip ring 24e. Therefore, any fluid that reaches the grip ring 24e will likely escape the annular cavity 44e via the gap 402 between the abutting wall 30e and the exterior surface 150e of the structure 12e, thereby creating a leak. Such a leak may develop even where the gap 402 is closed in the compressed position because the contact between the abutting wall 30e and the exterior surface 150e of the structure 12e in the compressed position may not create a fluid-tight seal. As such, the redundancy provided by the multiple contact points 404 is particularly beneficial in ensuring that a leak does not develop, even at high pressures. The redundancy also minimizes leaks in the event of accidental perforation, cutting, or breakage of the seal element 22e during insertion of the structure 12e into the insertion end 26e of the fitting body 20e. The redundancy provided by the multiple contact points 404 also decreases the likelihood of leaks caused by imperfections in the interior surface 32e of the insertion end 26e of the fitting body 20e and/or the exterior surface 150e of the structure 12e.

As shown in FIGS. 10A and 10B, the annular cavity 44e has a longitudinal length L measured longitudinally between the throat portion 25e and the abutting wall 30e. The seal element 22e, the spacing element 400, and the grip ring 24e are disposed in a side-by-side abutting relationship within the annular cavity 44e and together substantially span the longitudinal length L of the annular cavity 44e. This arrangement therefore minimizes relative movement between the seal element 22e, the spacing element 400, and the grip ring 24e within the annular cavity 44e. It is further noted that the term "substantially span" as used herein means that the seal element 22e, the spacing element 400, and the grip ring 24e together extend along at least 85% of the longitudinal length L of the annular cavity 44e.

In the assembly 10e shown in FIGS. 10A and 10B, the seal element 22e is positioned longitudinally between the grip ring 24e and the spacing element 400. Accordingly, the spacing element 400 is disposed in the annular cavity 44e adjacent to the throat portion 25e. The seal element 22e illustrated has a circular cross-section and a cross-sectional diameter D. The cross-sectional diameter D of the seal element 22e is measured when the mount 40e and the abutting wall 30e of the insertion end 26e are in the expanded position such that the seal element 22e is uncompressed. The cross-sectional diameter D of the seal element 22e, when the seal element 22e is uncompressed, is greater than the height H of the annular cavity 44e when the mount 40e and the abutting wall 30e of the insertion end 26e are in the compressed position. Accordingly, the seal element 22e is compressed between and sealingly engages the exterior surface 150e of the structure 12e and the interior surface 32e of the insertion end 26e of the fitting body 20e when the mount 40e and the abutting wall 30e of the insertion end 26e are in the compressed position. Similarly, the spacing element 400 has a cross-sectional thickness T (see FIG. 10C) that is measured when the mount 40e and the abutting wall 30e of the insertion end 26e are in the expanded position such that the spacing element 400 is uncompressed. The cross-sectional thickness T of the spacing element 400 is greater than the height H of the annular cavity 44e when the mount 40e and the abutting wall 30e of the insertion end 26e of the fitting body 20e are in the compressed position. Accordingly, the spacing element 400 is compressed between and sealingly engages the exterior surface 150e of the structure 12e and the interior surface 32e of the insertion end 26e of the fitting body 20e when the mount 40e and said abutting wall 30e of the insertion end 26e are in the compressed position.

Referring now to FIG. 10C, the spacing element 400 from assembly 10e is shown by itself in a partial, longitudinal section view. The spacing element 400 generally has an X-shaped cross-section. The spacing element 400 includes four annularly extending lobes 406 that project from the spacing element 400. The four annularly extending lobes 406 are interconnected and define four valleys 408 in the spacing element 400. Each valley 408 of the four valleys 408 extends annularly and is positioned between two adjacent annularly extending lobes 406. Two lobes 406 of the four annularly extending lobes 406 cooperate to define a first inner diameter ID1 of the spacing element 400. The valley 408 disposed between those two lobes 406 defines a second inner diameter ID2 of the spacing element 400. The second inner diameter ID2 is larger than the first inner diameter ID1. Another two lobes 406 of the four annularly extending lobes 406 cooperate to define a first outer diameter OD1 of the spacing element 400. The valley 408 disposed between those two lobes 406 defines a second outer diameter OD2 of the spacing element 400. The first outer diameter OD1 is larger than the second outer diameter OD2. Thus, it should be appreciated that the cross-sectional thickness T may be determined by subtracting the first inner diameter ID1 from the first outer diameter OD1.

Referring to FIGS. 10A-10C, one of the valleys 408 of the spacing element 400 partially receives the seal element 22e such that the seal element 22e and the spacing element 400 partially nest with one another. The seal element 22e and two lobes 406 of the four annularly extending lobes 406 of said spacing element 400 contact the interior surface 32e of said insertion end 26e to define three contact points 404 along the interior surface 32e of the insertion end 26e. Additionally, the seal element 22e and another two lobes 406 of the four annularly extending lobes 406 of the spacing element 400 contact the exterior surface 150e of the structure 12e to define three contact points 404 along the exterior surface 150e of the structure 12e. Accordingly, the shape and arrangement of the seal element 22e and the spacing element 400 provide a total of six contact points 404 to seal the annular cavity 44e.

Figure 11B:
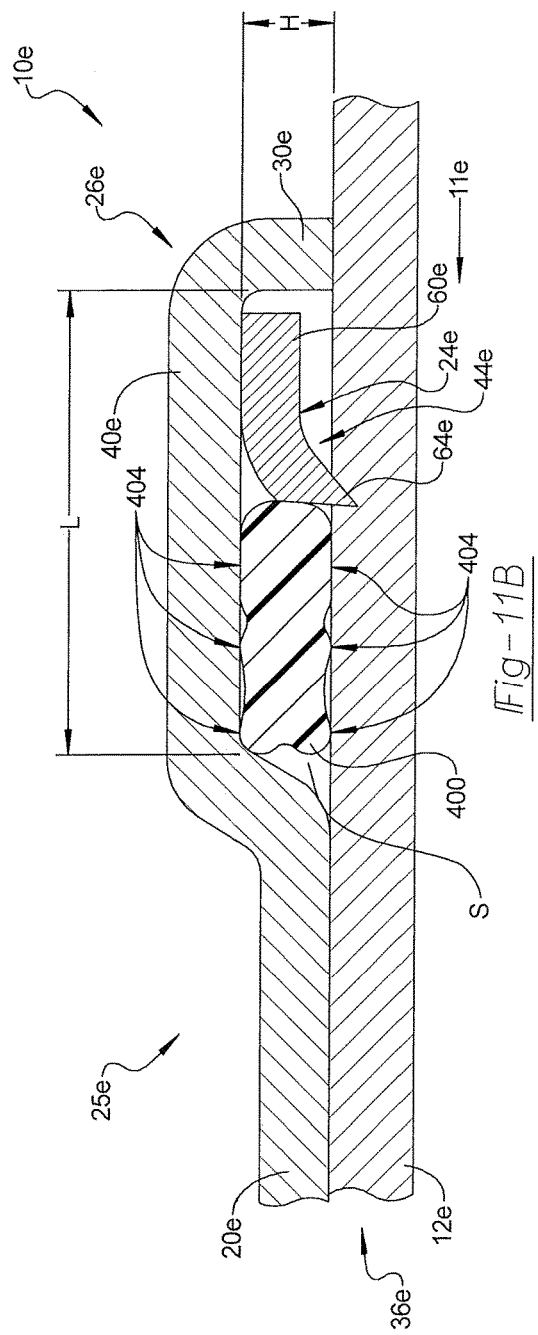
FIG. 11B is another longitudinal sectional view of the portion of the assembly of FIG. 11A where the assembly is shown in a compressed position.
Figure 11C:
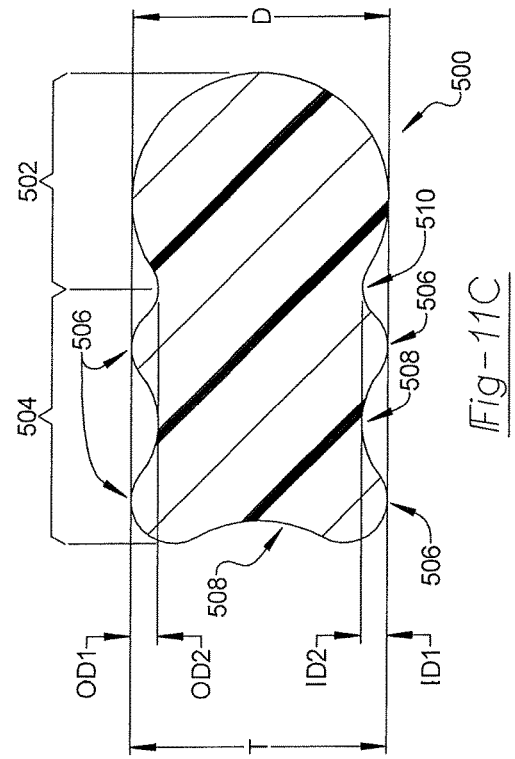
FIG. 11C is a longitudinal sectional view of a portion of an exemplary, asymmetrical seal element of the assembly of FIG. 11A.

FIGS. 11A-11C illustrate another arrangement where the assembly 10e of FIGS. 10A-10C has been modified, where the separate seal element 22e and spacing element 400 of FIGS. 10A-10C have been replaced by a combined seal and spacing element 500. Referring to FIGS. 11A-11C, the combined seal and spacing element 500 is made of a resilient material or materials and therefore is compressible. By way of example and without limitation, the combined seal and spacing element 500 may be made of a polymer, including elastomers such as rubber. The combined seal and spacing element 500 is disposed in the annular cavity 44e and extends longitudinally between the throat portion 25e of the fitting body 20e and the grip ring 24e. The combined seal and spacing element 500 extends radially across the height H of the annular cavity 44e at multiple longitudinally spaced locations. Accordingly, the combined seal and spacing element 500 contacts and sealingly engages the exterior surface 150e of the structure 12e at multiple contact points 404 and the combined seal and spacing element 500 contacts and sealingly engages the interior surface 32e of the insertion end 26e at multiple contact points 404. Advantageously, the combined seal and spacing element 500 acts to seal the annular cavity 44e at multiple contact points 404 for improved sealing and maintains the longitudinal position of the grip ring 24e within the annular cavity 44e. Additionally, the combined seal and spacing element 500 provides a higher burst pressure rating of the assembly 10e because the combined seal and spacing element 500 expands and fills a greater volume of the annular cavity 44e when the structure 12e is inserted through the opening 11e in the insertion end 26e and into the throat portion 25e of the fitting body 20e and as the insertion end 26e of the fitting body 20e is compressed during installation. Furthermore, by filling a greater volume of the annular cavity 44e due to elastomer spread, the combined seal and spacing element 500 reduces the ability of the grip ring 24e, and thus the structure 12e, to shift longitudinally relative to the fitting body 20e after pressurization.

As shown in FIGS. 11A and 11B, the grip ring 24e and the combined seal and spacing element 500 are arranged in a side-by-side relationship and substantially span the length L of the annular cavity 44e. The grip ring 24e is disposed in the annular cavity 44e adjacent to the abutting wall 30e and the combined seal and spacing element 500 is disposed in the annular cavity 44e adjacent to the throat portion 25e of the fitting body 20e. FIG. 11C is a partial, longitudinal section view showing the combined seal and spacing element 500 by itself. With reference to FIG. 11C, the combined seal and spacing element 500 includes a first segment 502 and a second segment 504 that are connected to one another. By way of example and without limitation, the combined seal and spacing element 500 may be one piece such that the first and second segments 502, 504 are integrally formed pf s homogeneous material. Of course other configurations are possible where the first and second segments 502, 504 are separate pieces that are joined or attached to one another and may be made of the same material or different materials.

With reference to FIGS. 11B and 11C, the first segment 502 of the combined seal and spacing element 500 has a circular cross-section and a cross-sectional diameter D. The cross-sectional diameter D of the first segment 502 is measured when the mount 40e and the abutting wall 30e of the insertion end 26e are in the expanded position such that the combined seal and spacing element 500 is uncompressed. The cross-sectional diameter D of the first segment 502, when the combined seal and spacing element 500 is uncompressed, is greater than the height H of the annular cavity 44e when the mount 40e and the abutting wall 30e of the insertion end 26e are in the compressed position. Accordingly, the first segment 502 of the combined seal and spacing element 500 is compressed between and sealingly engages the exterior surface 150e of the structure 12e and the interior surface 32e of the insertion end 26e of the fitting body 20e when the mount 40e and the abutting wall 30e of the insertion end 26e are in the compressed position. The first segment 502 thus defines one contact point 404 between the combined seal and spacing element 500 and the exterior surface 150e of the structure 12e and another contact point 404 between the combined seal and spacing element 500 and the interior surface 32e of the insertion end 26e of the fitting body 20e.

The second segment 504 of the combined seal and spacing element 500 includes four annularly extending lobes 506 giving the second segment 504 a somewhat X-shaped cross-section. The second segment 504 has a cross-sectional thickness T that is measured when the mount 40e and the abutting wall 30e of the insertion end 26e are in the expanded position such that the combined seal and spacing element 500 is uncompressed. The cross-sectional thickness T of the second segment 504 may be equal to the cross-sectional diameter D of the first segment 502 and is greater than the height H of the annular cavity 44e when the mount 40e and the abutting wall 30e of the insertion end 26e of the fitting body 20e are in the compressed position. Accordingly, the second segment 504 of the combined seal and spacing element 500 is compressed between and sealingly engages the exterior surface 150e of the structure 12e and the interior surface 32e of the insertion end 26e of the fitting body 20e when the mount 40e and said abutting wall 30e of the insertion end 26e are in the compressed position. Accordingly, two lobes 506 of the four annularly extending lobes 506 define another two contact points 404 between the combined seal and spacing element 500 and the exterior surface 150e of the structure 12e and another two lobes 506 of the four annularly extending lobes 506 define two more contact points 404 between the combined seal and spacing element 500 and the interior surface 32e of the insertion end 26e of the fitting body 20e. Therefore, three contact points 404 are created between the combined seal and spacing element 500 and the exterior surface 150e of the structure 12e and another three contact points 404 are created between the combined seal and spacing element 500 and the interior surface 32e of the insertion end 26e of the fitting body 20e for a total of six contact points 404 that seal the annular cavity 44e.

The four annularly extending lobes 506 of the second segment 504 are interconnected and define three valleys 508 in the combined seal and spacing element 500. Each valley 508 of the three valleys 508 extends annularly and is positioned between two adjacent annularly extending lobes 506. Two lobes 506 of the four annularly extending lobes 506 cooperate to define a first inner diameter ID1 of the combined seal and spacing element 500. The valley 508 disposed between those two lobes 506 defines a second inner diameter ID2 of the combined seal and spacing element 500. The second inner diameter ID2 is larger than the first inner diameter ID1. Another two lobes 506 of the four annularly extending lobes 506 cooperate to define a first outer diameter OD1 of the combined seal and spacing element 500. The valley 508 disposed between those two lobes 506 defines a second outer diameter OD2 of the combined seal and spacing element 500. The first outer diameter OD1 is larger than the second outer diameter OD2. Thus, it should be appreciated that the cross-sectional thickness T of the second segment 504 may be determined by subtracting the first inner diameter ID1 from the first outer diameter OD1. The first and second segments 502, 504 of the combined seal and spacing element 500 meet at a neck region 510 of reduced thickness. In accordance with one possible arrangement, the combined seal and spacing element 500 may taper from the first outer diameter OD1 to the second outer diameter OD2 at the neck region 510 and from the first inner diameter ID1 to the second inner diameter ID2 at the neck region 510.

It should be appreciated that FIGS. 10A-10C and FIGS. 11A-11C are partial, longitudinal section views showing only half of the assembly 10e. It should also be appreciated that the assembly 10e and its constituent parts generally extend annularly such that a mirror image of the views shown exist at a diametrically opposed location (180 degrees) along the annular assembly 10e. Therefore, the terms "circular cross-section", "cross-sectional diameter", "X-shaped cross-section", and "cross-sectional thickness", as used herein, describe a cross-section of a partial, longitudinal section of the assembly 10e, such as those shown in FIGS. 10A-10C and FIGS. 11A-11C. It should also be appreciated that the combined seal and spacing element 500 can be configured to have different cross-sectional shapes than that shown in FIGS. 11A-11C.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An assembly comprising:
   a fitting body having an insertion end, said insertion end including a mount and an abutting wall that extend annularly to define an opening in said insertion end of said fitting body;
   a structure having an exterior surface and an end that is received in said opening;
   an annular cavity disposed within said insertion end of said fitting body that extends about said exterior surface of said structure, said insertion end of said fitting body including an interior surface that is positioned outwardly of said exterior surface of said structure such that said annular cavity is defined between said interior surface of said insertion end and said exterior surface of said structure, said annular cavity having a height measured radially between said interior surface of said insertion end and said exterior surface of said structure;
   a grip ring disposed in said annular cavity adjacent to said abutting wall, said grip ring including a ring body that extends about said structure and a plurality of first teeth that are resiliently coupled to said ring body, said plurality of first teeth extending radially inwardly to engage said exterior surface of said structure;
   a seal element disposed in said annular cavity that is made of a resilient material, said seal element extending radially across said height of said annular cavity such that said seal element contacts and sealingly engages said exterior surface of said structure and said interior surface of said insertion end; and
   a spacing element disposed in said annular cavity adjacent said seal element that is made of a resilient material, said spacing element extending radially across said height of said annular cavity such that said spacing element contacts and sealingly engages said exterior surface of said structure and said interior surface of said insertion end,
   wherein said spacing element includes four annularly extending lobes that project from said spacing element,
   wherein said four annularly extending lobes define four valleys, with each valley being positioned between two adjacent annularly extending lobes.

2. The assembly of claim 1, wherein said seal element and said spacing element together define multiple contact points along both said interior surface of said insertion end and said exterior surface of said structure that create a tortuous path for fluid flow and that isolate said grip ring from fluid contained within said annular cavity.

3. The assembly of claim 1, wherein said annular cavity has a longitudinal length and said seal element, said spacing element, and said grip ring are disposed in a side-by-side abutting relationship within said annular cavity and together substantially span said longitudinal length of said annular cavity to minimize relative movement between said seal element, said spacing element, and said grip ring within said annular cavity.

4. The assembly of claim 1, wherein said spacing element is positioned longitudinally between said grip ring and said seal element within said annular cavity.

5. The assembly of claim 1, wherein said seal element and said spacing element both have circular cross-sections.

6. The assembly of claim 1, wherein said seal element is positioned longitudinally between said grip ring and said spacing element within said annular cavity.

7. The assembly of claim 1, wherein said seal element has a circular cross-section and said spacing element has an X-shaped cross-section.

8. The assembly of claim 1, wherein said seal element and two lobes of said four annularly extending lobes of said spacing element contact said interior surface of said insertion end to define three contact points along said interior surface of said insertion end and wherein said seal element and another two lobes of said four annularly extending lobes of said spacing element contact said exterior surface of said structure to define three contact points along said exterior surface of said structure.

9. The assembly of claim 1, wherein said seal element and said spacing element are made of two different resilient materials of different elasticity.

10. The assembly of claim 1, wherein one of said valleys of said spacing element partially receives said seal element such that said seal element and said spacing element partially nest with one another.

11. An assembly comprising:
    a fitting body having an insertion end;
    said insertion end including a mount and an abutting wall that extend annularly to define an opening in said insertion end of said fitting body;
    a structure having an exterior surface and an end that is received in said opening of said insertion end of said fitting body;
    said fitting body being made of a flexible material such that said mount and said abutting wall transition from an expanded position where said abutting wall is spaced from said exterior surface of said structure by a gap and a compressed position where said abutting wall moves radially inwardly toward and contacts said exterior surface;
    said insertion end of said fitting body including an interior surface that is spaced radially outwardly of said exterior surface of said structure such that an annular cavity is defined therein between said fitting body and said structure;
    said annular cavity having a height measured radially between said interior surface of said insertion end and said exterior surface of said structure that diminishes when said mount and said abutting wall transition from said expanded position to said compressed position;
    a grip ring disposed in said annular cavity adjacent said abutting wall, said grip ring including a ring body and a plurality of first teeth that are resiliently coupled to said ring body, said plurality of first teeth engaging said exterior surface of said structure when said mount and said abutting wall are in said compressed position;
    a seal element disposed in said annular cavity, said seal element being made of a resilient material, said seal element having a circular cross-section and a cross-sectional diameter measured when said seal element is uncompressed, said cross-sectional diameter of said seal element being greater than said height of said annular cavity when said mount and said abutting wall are in said compressed position such that said seal element is compressed between and sealingly engages said exterior surface of said structure and said interior surface of said insertion end when said mount and said abutting wall are in said compressed position; and a spacing element disposed in said annular cavity adjacent said seal element, said spacing element being made of a resilient material, said spacing element having a cross-sectional thickness measured when said spacing element is uncompressed, said cross-sectional thickness of said spacing element being greater than said height of said annular cavity when said mount and said abutting wall are in said compressed position such that said spacing element is compressed between and sealingly engages said exterior surface of said structure and said interior surface of said insertion end when said mount and said abutting wall are in said compressed position, wherein said spacing element includes four annularly extending lobes that project from said spacing element, wherein said four annularly extending lobes define four valleys, with each valley being positioned between two adjacent annularly extending lobes.

12. The assembly of claim 11, wherein said gap between said abutting wall and said exterior surface of said structure is reduced in size when said mount and said abutting wall transition from said expanded position to said compressed position.

13. The assembly of claim 11, wherein said gap between said abutting wall and said exterior surface of said structure is closed when said mount and said abutting wall transition from said expanded position to said compressed position such that said abutting wall contacts said exterior surface of said structure in said compressed position.

14. The assembly of claim 11, wherein said seal element is positioned longitudinally between said grip ring and said spacing element within said annular cavity.

15. The assembly of claim 11, wherein one of said valleys of said spacing element partially receives said seal element such that said seal element and said spacing element partially nest with one another.

16. An assembly comprising:

a fitting body having a throat portion and an insertion end, said insertion end including a mount and an abutting wall that extend annularly to define an opening in said insertion end of said fitting body;

a structure having an exterior surface and an end that is received in said opening;

an annular cavity disposed within said insertion end of said fitting body that extends about said exterior surface of said structure, said insertion end of said fitting body including an interior surface that is positioned outwardly of said exterior surface of said structure such that said annular cavity is defined between said interior surface of said insertion end and said exterior surface of said structure, said annular cavity having a height measured radially between said interior surface of said insertion end and said exterior surface of said structure;

a grip ring disposed in said annular cavity adjacent to said abutting wall, said grip ring including a ring body that extends about said structure and a plurality of first teeth that are resiliently coupled to said ring body, said plurality of first teeth extending radially inwardly to engage said exterior surface of said structure; and a combined seal and spacing element disposed in said annular cavity that extends longitudinally between said throat portion of said fitting body and said grip ring and extends radially across said height of said annular cavity at multiple longitudinally spaced locations such that said combined seal and spacing element contacts and sealingly engages said exterior surface of said structure at multiple contact points and such that said combined seal and spacing element contacts and sealingly engages said interior surface of said insertion end at multiple contact points, said combined seal and spacing element being made of a resilient material that is compressible, wherein said combined seal and spacing element includes a first segment and a second segment that are connected to one another, said first segment having a circular cross-section that defines one contact point between said combined seal and spacing element and said exterior surface of said structure and another contact point between said combined seal and spacing element and said interior surface of said insertion end, said second segment including four annularly extending lobes giving the second segment an X-shaped cross-section and wherein two of said four annularly extending lobes define two contact points between said combined seal and spacing element and said exterior surface of said structure and another two lobes of said four annularly extending lobes define two more contact points between said combined seal and spacing element and said interior surface of said insertion end.

17. The assembly of claim 16, wherein said annular cavity has a length measured longitudinally between said abutting wall and said throat portion and wherein said grip ring and said combined seal and spacing element are arranged in a side-by-side relationship and substantially span said length of said annular cavity.

18. The assembly of claim 16, wherein said first segment of said combined seal and spacing element is positioned directly adjacent to said grip ring.

* * * * *